United States Patent [19]

Dittmann, Jr.

[11] 4,449,602
[45] May 22, 1984

[54] REAR SUSPENSION AND STORAGE BOX FOR A THREE-WHEEL MOTORCYCLE

[75] Inventor: Fred M. Dittmann, Jr., Lake Zurich, Ill.

[73] Assignee: Municipal Industries, Inc., Chicago, Ill.

[21] Appl. No.: 396,639

[22] Filed: Jul. 9, 1982

[51] Int. Cl.³ .............................................. B62K 5/06
[52] U.S. Cl. .................................... 180/215; 280/282
[58] Field of Search ............... 180/215, 216, 217, 210, 180/211, 212, 213, 214; 280/62, 282

[56] References Cited

U.S. PATENT DOCUMENTS

| 1,271,553 | 7/1918 | Elliott | 180/215 |
| 1,879,275 | 9/1932 | Ison | 180/215 |
| 2,878,032 | 3/1959 | Hawke | 280/282 |

FOREIGN PATENT DOCUMENTS

| 1020281 | 2/1953 | France | 180/217 |
| 27340 | 3/1921 | Netherlands | 180/215 |

Primary Examiner—Joseph F. Peters, Jr.
Assistant Examiner—D. Lynn Fugate
Attorney, Agent, or Firm—Jacques M. Dulin

[57] ABSTRACT

The invention provides an improved, independent swing-arm type suspension for three-wheel vehicles and includes a special yoke frame in which the rear axle is rigidly mounted, and cross rails for mounting a storage box thereon. The box is mounted directly onto the frame cross rails. The entire rear assembly is mounted by swing-arm pivot and triple spring/shocks between the main frame and the rear swing-arm frame assembly. This assembly moves the point of travel to below the rider's seat, thus giving improved ride and handling characteristics. The rear axle employs a fully engineered off-center differential connected to an in-line drive shaft for better performance and easier maintenance.

17 Claims, 5 Drawing Figures

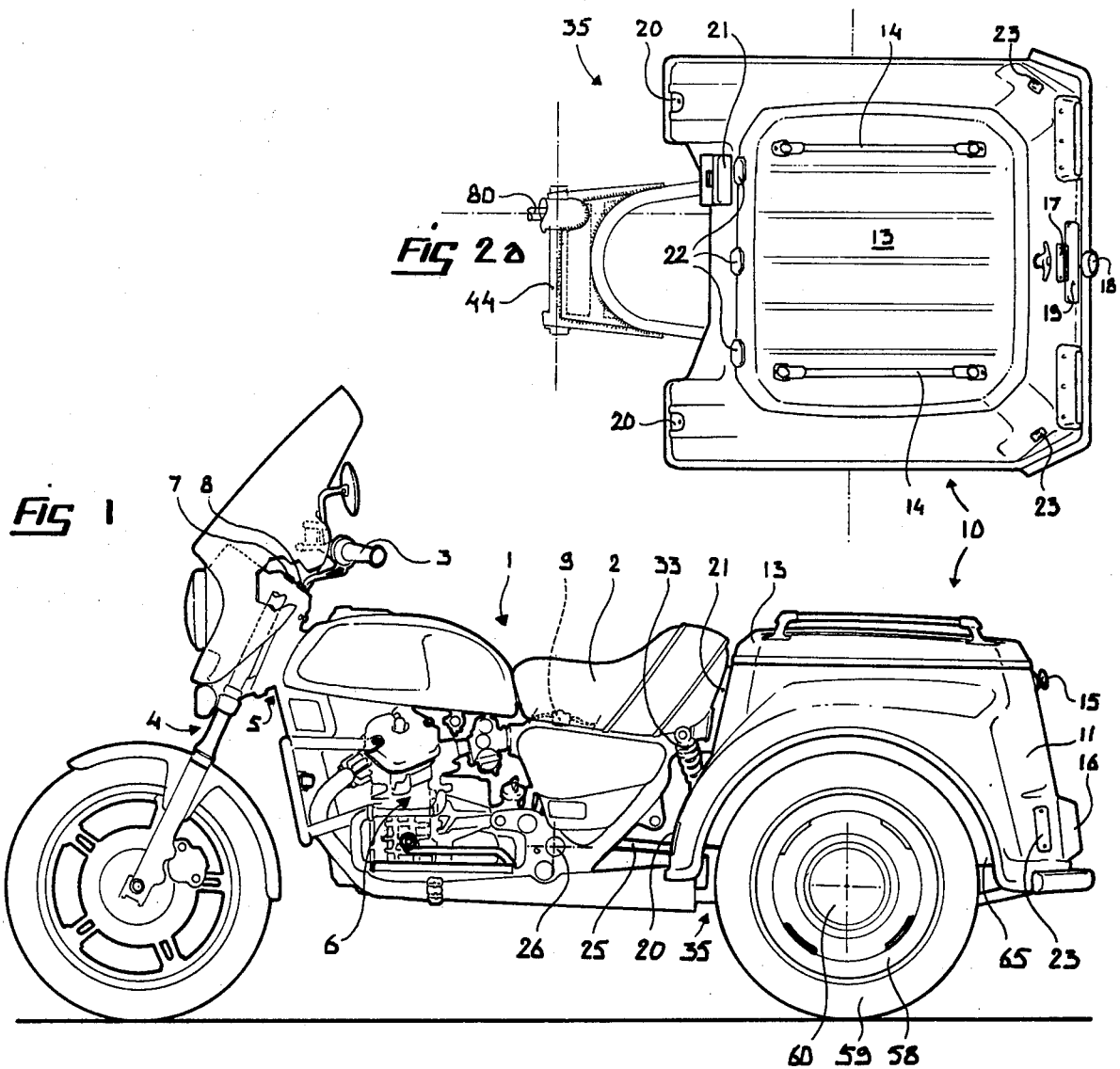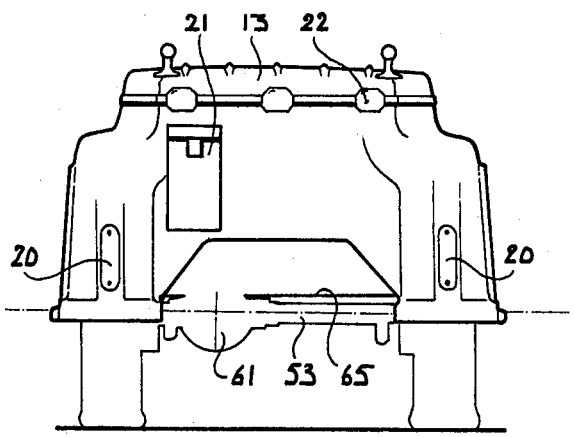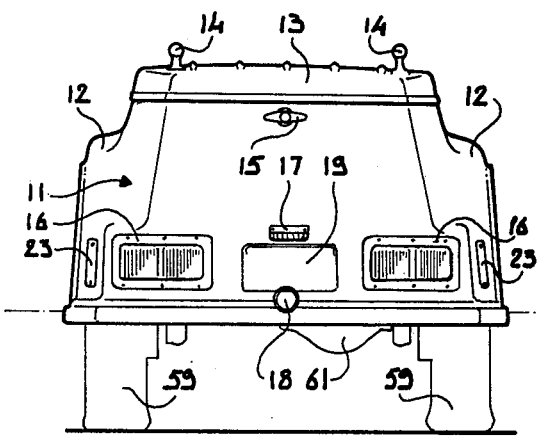

REAR SUSPENSION AND STORAGE BOX FOR A THREE-WHEEL MOTORCYCLE

CROSS REFERENCES TO RELATED APPLICATIONS

The three-wheel motorcycle of this invention may employ the improved gear train shown in my co-pending application, Ser. No. 06/396642 filed of even date herewith. The disclosure of that application is incorporated by reference herein.

BACKGROUND OF THE INVENTION

1. Field of the Invention

This invention relates to three-wheel motorcycles and more particularly to provision of special swing-arm, independent suspension, rear frame assembly for a storage box for use in police and emergency type vehicles.

2. Description of the Prior Art

Three-wheel emergency vehicles or motorcycles are generally of two types: those having a side car for a passenger; and the type involved here, those having a rear storage box disposed between driven rear wheels. In the old Harley Davidson type of police vehicles, the engine drove a chain to a separate gear box, and in turn the rear axle was driven by a chain and gear assembly. The Harley used a one-piece frame which included both the front frame and the rear frame containing a rigid rear axle. It did not involve a swing-arm suspension of any type. The box was sprung from the rear solid, one-piece frame. More recently, the "Trident" brand three-wheel police vehicle manufactured by KVV Enterprises, Inc. of Cincinnati, Oh., employs a "box type" suspension having a one-piece frame in which a symmetric rear axle is mounted on a swivel plate, one end of which is sprung to the frame. The box is also mounted on springs to the rear frame.

In the case of the Harley Davidson, mounting the box on springs but having no springs in the frame causes frame fatigue, and an excessively loose box-type mounting. In addition, the box is more difficult to dismount as it is mounted on the springs. Similarly, mounting the rear axle on springs as in the case of the "Trident" provides a somewhat smoother ride as compared to the Harley, but is more complex to service, particularly the offset drive shaft to the symmetric differential.

Accordingly, there is a need for provision of an improved rear suspension and box assembly for three-wheel type of emergency and police vehicles.

THE INVENTION

Objects of the Invention

It is among the objects of this invention to provide an improved rear frame assembly of an independent swing-arm suspension type which provides for smoother rides and improved stability and handling.

It is another object of this invention to provide an improved three-wheel motorcycle for emergency and police usage that has a large storage box capacity which is rigidly mounted to a rear, independently sprung frame that is easy to dismount for work on the differential when required.

It is another object of this invention to provide an improved rear suspension and box assembly for three-wheel type vehicles.

Still further and other objects of the invention will become evident from the description which follows.

SUMMARY OF THE INVENTION

The invention provides an improved, independent swing-arm type suspension for three-wheel vehicles and includes a special yoke frame in which the rear axle is rigidly mounted, with cross rails for mounting a storage box thereon. The box is mounted directly onto the frame cross rails. The entire rear assembly is mounted by swing-arm pivot and triple spring/shocks between the main frame and the rear swing-arm frame assembly. This assembly moves the point of travel to below the rider's seat, thus giving improved ride and handling characteristics. The rear axle employs a fully engineered off-center differential connected to an in-line drive shaft for better performance and easier maintenance

BRIEF DESCRIPTION OF THE DRAWINGS

The detailed description below will have reference to the drawings in which:

FIG. 1 is a side elevation of the improved three-wheel police and emergency type vehicle of this invention showing the configuration and mounting;

FIG. 2 shows a top plan view in FIG. 2a, a rear elevation in FIG. 2b and a front elevation in FIG. 2c of the storage box configuration as mounted on the rear frame assembly.

DETAILED DESCRIPTION OF THE PREFERRED EMBODIMENT

Figure 3:
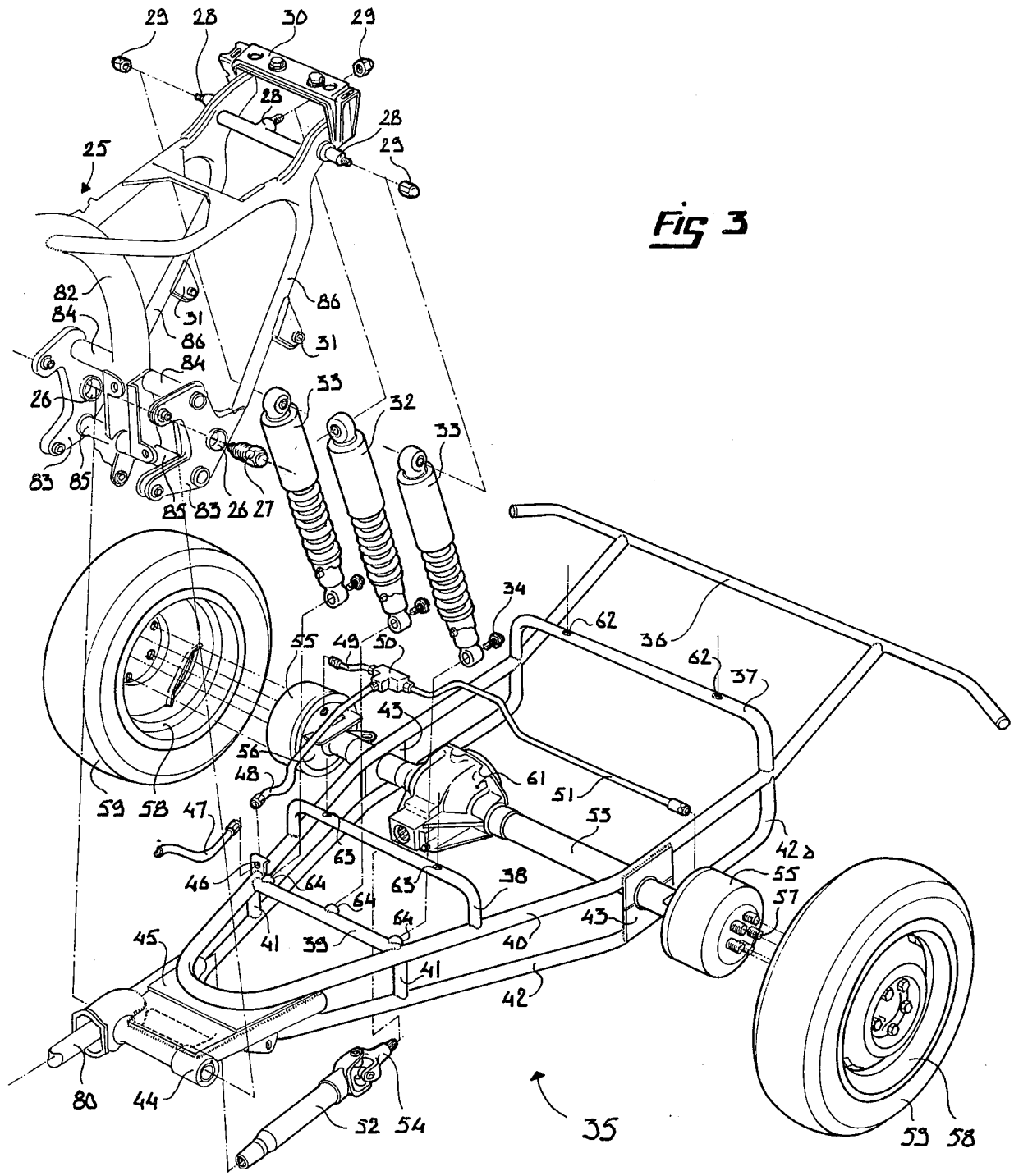
FIG. 3 is an exploded perspective of the rear swing-arm assembly and its connection to the main frame with the box removed to show details of the frame.

The preferred embodiment of the invention is described below in detail as representative of the principles of the invention, and not by way of limitation thereof. The specific example is by reference is attachment of the improved rear frame/suspension and storage box assembly of this invention to the front end of a Honda CX 500 custom motorcycle, which motorcycle may employ the improved reverse gear transmission of my copending application Ser. No. 06/396642.

Turning now to FIG. 1, this figure illustrates in a side elevation the improved motorcycle assembly 1 of this invention having a seat 2 for a rider, handlebars 3 controlling a front fork and wheel assembly 4 in steering head 5, with an engine and transmission assembly 6 mounted on a standard main frame assembly 25. As part of the control console, the rider has available a neutral indicator light 7 and a reverse gear indicator light 8. Back-up beeper 9 is located beneath the seat 2. When the cycle of this invention is engaged in reverse gear, the reverse gear indicator light is illuminated, and the back-up beeper 9 sounds to warn pedestrians or persons behind the vehicle that the vehicle is going to be in rearward motion.

The improved rear storage box assembly 10 of this invention comprises a fiberglass shell of 9.5 cu. ft. capacity. It has wheel fenders 12 on each side over the rear wheels, and a lid 13 for access into the storage area of the box. Handrails 14 are provided on the lid which is also lockable by the combination lock and lid handle 15. The rear of the box, as best shown in FIG. 2b, contains a right and left brake, turn signal and running light assembly 16. Over the top of license plate bracket 19 is a license light 17. Disposed below the license oracket is a back-up light 18 which is illuminated when the transmission is put into reverse gear.

As best seen in FIGS. 2a and 2c, front reflectors 20 are visible from the front, and side reflectors 23 are visible from each side. FIGS. 2a and 2c also show best the hinges 22 for the box lid 13, and the citation (traffic ticket) holder 21. It can be appreciated that the citation holder may be replaced by (or there may be provided in addition thereto) other types of accessory items, such as a nightstick or riot gun bracket, radio gear, helmet hooks, raincovers and the like.

FIG. 1 also shows the rear end of the main frame 25 is connected to the rear frame assembly 35 at the swing-arm pivot 26. A pair of rear wheels 58 with their tires 59 are mounted on an axle having an off-center differential 61. The wheels may also have hubcaps 60.

Turning now to FIG. 3, this illustrates in exploded perspective the details of the rear frame assembly 35 and its connection to the rear portion of the main frame assembly 25. Before going into detail as to the rear frame assembly 35, the swing-arm pivoting connection will be described. Rear frame assembly 25 includes a main tube 82 having a pair of swing-arm plates 83 mounted on upper transverse tubes 84 and lower transverse tubes 85. The swing-arm plates 83 have rear frame pivot apertures 26 provided therein. The swing-arm transverse tube 44 fits between the swing-arm plates 83 and is pivotally secured therein by rear frame pivot bolts 27. A pair of Y-brackets 86 extend between the main tube 82 and the respective swing-arm plates 83, and contain seat mount plate 30 and upper shock mount studs 28. As shown, I prefer to use three combination-type shock absorber/spring units 32 and 33 for improved ride and handling characteristics. The nuts 29 secure the upper ends of the shock units to the appropriate upper shock mounts studs 28. The seat and shock Y-brackets 86 also provide muffler mount brackets 31.

Reviewing now the rear frame assembly 35, the swing-arm transverse tube 44 provides a housing for the front drive shaft assembly 80 which at that juncture has a universal joint which is connected to in-line rear drive shaft 52. In turn the rear drive shaft assembly 52 is attached by end yoke 54 to offset differential 61 of the rigid rear drive axle assembly 53. This axle, for example, may be a Dana model D-12 or D-30 type axle with offset differential on the split half-axles. It is a rigid axle which is rigidly mounted in rear axle mounting plate 43, and terminates in brake drum assembly 55 having a brake plate 56. The wheels 58 having their tires 59 are mounted on wheel studs 57 with standard bolts. Braking is supplied by flexible brake line 47 connected to fixed brake line 48. The three-outlet brake line directing block 50 connects to the transverse rigid brake lines 49 and 51 passing to the brake drums 55. The rear frame is secured to the swing-arm transverse tube 44 by a pair of mounting plates 45. The rear frame includes a top frame rail 40 and a lower frame rail 42, both of a U or yoke-shape configuration. The upper rail terminates in a transverse rear tube type bumper 36 extending between the arms of the Y or yoke upper frame rail. The lower frame rail 42 extends just to the back of the rear wheels 59 and is then bent upwardly at 42a to be secured to the upper frame rail. Forward uprights 41 provide rigidity and spacing of the two frame rails at the front portion of the frame assembly, corresponding to the upwardly bent portion 42a of the lower frame rail at the rear. The rigid axle 53 is secured between the two frame rails by plates 43. A transverse rail 39 provides transverse rigidity and stability of the frame and also carries lower shock mount threaded inserts 64. It should be noted that the shock/spring system employs a pair of outside shock absorber/spring units 33 and a center-mounted shock absorber/spring unit 32. This provides for better overall mounting as well as transverse stability. Note that the shocks are canted forwardly from bottom to top thus providing relatively linear compression when the rear frame moves arcuately upwardly as the rear wheels pass over bumps or holes. Thus, the cycle is sprung adjacent the back end of the seat and its pivot point is near the front of the seat providing for good center of mass pivoting.

The frame assembly 35 also provides a rear mounting rail 37 and a front mounting rail 38 for the rear storage box assembly 10. The forward rail carries a plurality of front box mount holes or studs 63, and the rear rail contains a plurality of rear box mount holes or studs 62. The interior box floor 65 (see FIGS. 1 and 2c) is bolted directly to the cross rails 37 and 38. The box is thus rigidly mounted on the rear frame as is the rear axle, yet independent swing-arm spring and shock bias suspension is provided. The flexible brake line 47 prevents kinking of the brake line due to flexing and is secured at brake line mounting plate 46 to the fixed (rigid) brake line assembly 48, 49, 50 and 51.

It should be understood that various modifications within the scope of this invention can be made by one of ordinary skill in the art without departing from the spirit thereof. I therefore wish my invention to be defined by the scope of the appended claims as broadly as the prior art will permit, and in view of this specification if need be.

I claim:

1. A swing-arm type rear frame and suspension assembly for three-wheel motor vehicles comprising in operative combination:
    (a) A generally U-shaped frame having its closed end disposed forward and open end disposed rearwardly;
    (b) said closed end of said frame having means for retaining a transverse disposed swing arm pivot member;
    (c) said swing-arm pivot member being adapted to be pivotally received in a main frame member of said vehicle;
    (d) said open end of said frame terminating in a transverse bumper member;
    (e) a rigid axle having means for retaining wheels at each end disposed medially of the ends of said frame and parallel to said bumper member and said swing-arm pivot member;
    (f) said rigid axle having an off-center differential;
    (g) said swing-arm pivot member being adapted to receive a drive shaft therethrough transverse to the pivotal axis of said swing arm, said drive shaft being aligned with said off-center differential;
    (h) at least one resilient member connecting said rear frame to said main frame, said resilient member being oriented generally vertically and inclined forwardly from bottom to top;
    (i) means for retaining said bottom end of said resilient member disposed on said frame intermediate said swing-arm pivot and said axle;
    (j) said main frame having a seat for a rider disposed thereon;

(k) means for retaining said top end of at said resilient member disposed beneath said main frame seat member; and (l) means for securing a load carrying member disposed on rear frame intermediate the ends thereof.

2. A rear frame assembly as in claim 1 wherein:
   (a) said U-shaped frame comprises a pair of rails, a first, top rail passing above said axle, and a second, lower rail passing below said axle;
   (b) said axle is secured to a pair of plate members each of which is secured to said rails; and
   (c) said closed end of said U-shaped rear frame is secured by a pair of plates to said swing-arm pivot member, said swing-arm pivot member being disposed between said plates.

3. A rear frame assembly as in claim 2 wherein:
   (a) said resilient member comprises a plurality of combination spring and shock absorber members.

4. A rear frame assembly as in claim 3 wherein:
   (a) there are three combination spring and shock absorber members, a pair disposed adjacent the sides of said seat, and one disposed centrally of said seat.

5. A rear frame assembly as in claim 1 wherein:
   (a) said load carrying is a covered storage box secured to said frame between said wheels.

6. A rear frame assembly as in claim 5 wherein:
   (a) said box includes:
      (1) a hinged lid,
      (2) fender members extending over said wheels,
      (3) a pair of combination running, stop and turn signal lighting means disposed on a rear face, and
      (4) said bumper extending rearwardly of said rear face.

7. A rear frame assembly as in claim 5 wherein:
   (a) said box additionally includes means for retaining traffic citations therein.

8. A rear frame assembly as in claim 6 wherein:
   (a) said resilient member comprises a plurality of combination spring and shock absorber members.

9. A rear frame assembly as in claim 8 wherein:
   (a) there are three combination spring and shock absorber members, a pair disposed adjacent the sides of said seat, and one disposed centrally of said seat.

10. A rear frame assembly as in claim 9 wherein:
    (a) said U-shaped frame comprises a pair of rails, a first, top rail passing above said axle, and a second, lower rail passing below said axle;
    (b) said axle is secured to a pair of plate members each of which is secured to said rails; and
    (c) said closed end of said U-shaped rear frame is secured by a pair of plates to said swing-arm pivot member, said swing-arm pivot member being disposed between said plates.

11. A rear frame assembly as in claim 10 wherein:
    (a) said box additionally includes means for retaining traffic citations therein.

12. In a three-wheeled motorcycle having a front frame including a steering head, a front fork and wheel assembly mounted therein, and controllable by handlebars, an engine assembly including fuel supply means and a transmission, and a pair of rear wheels on a rear frame supporting a storage box, the improvement which comprises:

(a) a generally U-shaped frame having its closed end disposed forward and open end disposed rearwardly;
(b) said closed end of said frame having means for retaining a transverse disposed swing arm pivot member;
(c) said swing-arm pivot member being adapted to be pivotally received in a main frame member of said vehicle;
(d) said open end of said frame terminating in a transverse bumper member;
(e) a rigid axle having means for retaining wheels at each end disposed medially of the ends of said frame and parallel to said bumper member and said swing-arm pivot member;
(f) said rigid axle having an off-center differential;
(g) said swing-arm pivot member being adapted to receive a drive shaft therethrough transverse to the pivotal axis of said swing arm, said drive shaft being aligned with said off-center differential;
(h) at least one resilient member connecting said rear frame to said main frame, said resilient member being oriented generally vertically and inclined forwardly from bottom to top;
(i) means for retaining said bottom end of said resilient member disposed on said frame intermediate said swing-arm pivot and said axle;
(j) said main frame having a seat for a rider disposed thereon;
(k) means for retaining said top end of said resilient member disposed beneath said main frame seat member;
(l) means for securing a load carrying member disposed on rear frame intermediate the ends thereof; and
(m) a covered storage box mounted on said securing means.

13. A rear frame assembly as in claim 12 wherein:
    (a) said U-shaped frame comprises a pair of rails, a first, top rail passing above said axle, and a second, lower rail passing below said axle;
    (b) said axle is secured to a pair of plate members each of which is secured to said rails; and
    (c) said closed end of said U-shaped rear frame is secured by a pair of plates to said swing-arm pivot member, said swing-arm pivot member being disposed between said plates.

14. A rear frame assembly as in claim 13 wherein:
    (a) said resilient member comprises a plurality of combination spring and shock absorber members.

15. A rear frame assembly as in claim 14 wherein:
    (a) there are three combination spring and shock absorber members, a pair disposed adjacent the sides of said seat, and one disposed centrally of said seat.

16. A rear frame assembly as in claim 15 wherein:
    (a) said box includes:
       (1) a hinged lid,
       (2) fender members extending over said wheels,
       (3) a pair of combination running, stop and turn signal lighting means disposed on a rear face, and
       (4) said bumper extending rearwardly of said rear face.

17. A rear frame assembly as in claim 16 wherein:
    (a) said box additionally includes means for retaining traffic citations therein.

* * * * *